Patented Sept. 5, 1922.

1,427,826

UNITED STATES PATENT OFFICE.

CHARLES R. KUZELL AND JOHN R. MARSTON, OF CLARKDALE, ARIZONA.

PURIFICATION OF ZINC-SULPHATE SOLUTIONS.

No Drawing. Application filed August 15, 1921. Serial No. 492,475.

*To all whom it may concern:*

Be it known that we, CHARLES R. KUZELL and JOHN R. MARSTON, citizens of the United States, residing at Clarkdale, in the county of Yavapai and State of Arizona, have invented certain new and useful Improvements in Purification of Zinc-Sulphate Solutions, of which the following is a specification.

Our invention has relation to the purification of zinc sulphate solutions, and producing a colored pigment from the impurities that are separated from the solution.

The primary object of the invention is to purify the zinc sulphate solution so that it may be used in the production of lithopone or in the electrolytic precipitation of zinc, for both of which operations a zinc sulphate solution of great purity is required. A further object is to remove the impurities, principally arsenic, copper and cadmium, with a reagent that will give a colored precipitate that may be used as a paint pigment.

The zinc sulphate solution is obtained by leaching baked zinc dust with hot water slightly acidulated with sulphuric acid. The solution, containing besides zinc sulphate a small amount of fume, ferrous sulphate, copper sulphate and arsenious acid, is decanted, after which the iron is removed with bleaching powder and milk of lime according to the process of purifying zinc sulphate described in the application filed of even date herewith by John R. Marston, Serial No. 492,471.

After the removal of the iron the zinc sulphate solution contains some arsenic and copper and cadmium sulphates, as impurities. The present invention relates particularly to the removal of these impurities by precipitation in a condition so that they may be used as a paint pigment. This is done as follows:

The solution is acidulated with sulphuric acid and then heated to almost 100° C. and barium sulphide solution is slowly added to the hot solution. The barium sulphide reacts with the sulphates of copper and cadmium to precipitate the metals as sulphides according to the reactions:

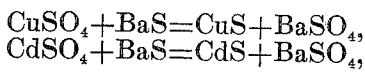

while the small amount of arsenic present is precipitated as the sulphide $As_2S_3$.

The solution containing zinc sulphate and sulphuric acid is filtered off. The precipitate containing barium sulphate, copper sulphide, cadmium sulphide and arsenic sulphide is washed and may be used as a pigment. If there is no copper present the color of this pigment would be yellow from the CdS and $As_2S_3$. However, this color will be modified according to the amount of copper present. The filtrate is finally treated with lime rock to neutralize the solution, after which the resulting precipitate is filtered off and the pure solution treated with barium sulphide to form lithopone; or it may be used for the electrolytic precipitation of zinc, in which process a purified acid solution of zinc sulphate is necessary.

We do not wish to be understood as limiting ourselves to the use of barium sulphide for the precipitation of the impurities, as other sulphide may do equally well, such as zinc sulphide or freshly precipitated lithopone.

As described in the application of John R. Marston above referred to, the zinc sulphate solution may be treated with zinc dust (after the iron has been removed) to precipitate the copper and cadmium as metals, which would probably be the most desirable method if much copper were present. The arsenic could then be removed by treating the solution with a sulphide as above set forth.

From the foregoing it will be apparent that we have accomplished a two-fold purpose by our new process; the one, purification of the zinc sulphate solution; and the other, the production of a paint pigment from the impurities.

Having described our invention, we claim:

1. The process of purifying zinc sulphate solution containing arsenic as an impurity, which comprises acidulating the solution with sulphuric acid, treating the solution with a metallic sulphide, and heating the same until the arsenic is precipitated as a sulphide.

2. The process of purifying zinc sulphate solutions containing arsenic as an impurity which comprises acidulating and heating the solution to approximately the boiling point, and gradually adding barium sulphide to the solution until the arsenic is precipitated as a sulphide.

3. The process of producing a paint pigment which consists in purifying a zinc sulphate solution containing other metals as impurities, which comprises acidulating the solution and treating the same with barium sulphide whereupon the impurities will be precipitated as sulphides.

4. The process of producing a paint pigment which consists in purifying a zinc sulphate solution containing cadmium and arsenic as impurities, which comprises acidulating and heating the solution, and thereafter adding to the solution a metallic sulphide whereupon the impurities will be precipitated as sulphides.

In testimony whereof we hereunto affix our signatures.

CHARLES R. KUZELL.
JOHN R. MARSTON.